United States Patent [19]

Dubois

[11] 4,113,214
[45] Sep. 12, 1978

[54] TRASH CAN TRANSPORTER

[76] Inventor: Leo Francis Dubois, Tower Hill Rd., Cumberland, R.I. 02864

[21] Appl. No.: 790,845

[22] Filed: Apr. 25, 1977

Related U.S. Application Data

[63] Continuation-in-part of Ser. No. 619,682, Nov. 13, 1975, abandoned.

[51] Int. Cl.² .............................................. A47G 23/02
[52] U.S. Cl. .............................. 248/146; 248/DIG. 7; 280/47.24
[58] Field of Search .................... 280/46, 47.21, 47.24; 214/384; 248/146, DIG. 7

[56] References Cited

U.S. PATENT DOCUMENTS

| | | | |
|---|---|---|---|
| 2,522,036 | 9/1950 | Haake | 248/DIG. 7 |
| 2,546,797 | 3/1951 | Swisher et al. | 248/DIG. 7 |
| 2,903,147 | 9/1959 | Davis | 214/384 |
| 3,045,851 | 7/1962 | Rupert | 280/47.24 |
| 3,233,764 | 2/1966 | Hinsch | 280/47.24 |
| 3,240,459 | 3/1960 | Spohn | 248/DIG. 7 |
| 3,376,986 | 4/1968 | Farber | 280/47.24 |
| 3,675,783 | 7/1972 | Reese | 248/154 |
| 3,845,968 | 11/1974 | Larson | 280/47.24 |
| 3,847,407 | 11/1974 | Balletto | 280/46 |

Primary Examiner—Robert A. Hafer
Attorney, Agent, or Firm—Salter & Michaelson

[57] ABSTRACT

A trash can transporter for use with a vertical support post that is fixed in the ground or to a base and that is provided with a lower can brace against which a lower portion of a trash can is received when the trash can is mounted on the post. Mounted on the uppermost end of the post is a handle support having a flange over which a handle of the can is received when the can is mounted on the post. The transporter permits easy removal of the trash can from the post and is formed with a central column having a pair of can braces mounted thereon in spaced relation for supporting the can during the transporting movement thereof, a handle bracket being joined to the column adjacent to the upper end thereof and receiving the handle of the trash can when the trash can is removed from the vertical post for the transporting thereof.

2 Claims, 8 Drawing Figures

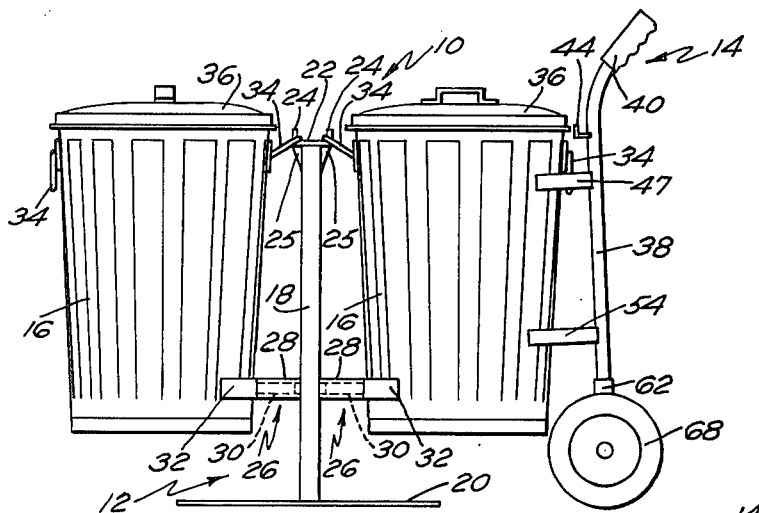
FIG. 1
FIG. 2
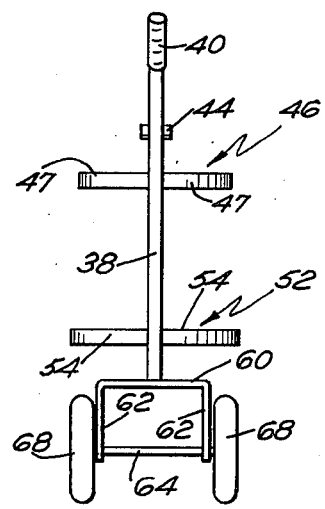
FIG. 4
FIG. 5
FIG. 6
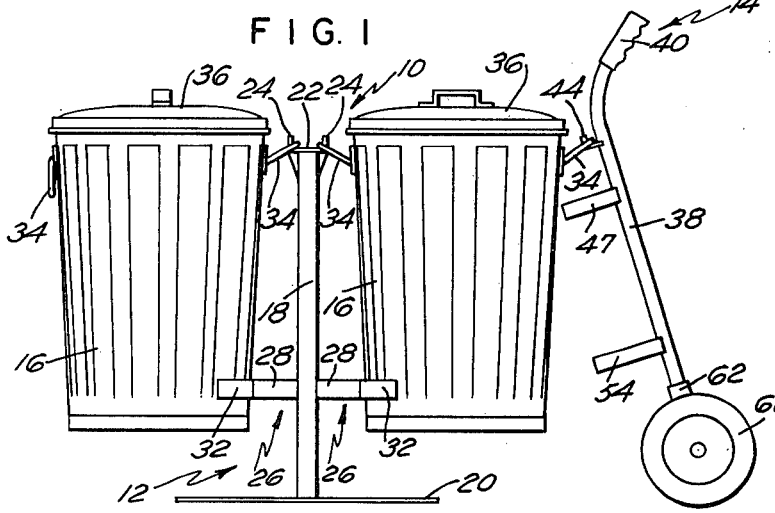
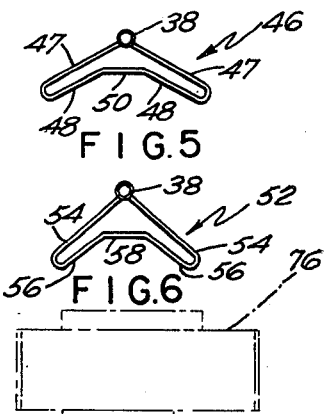
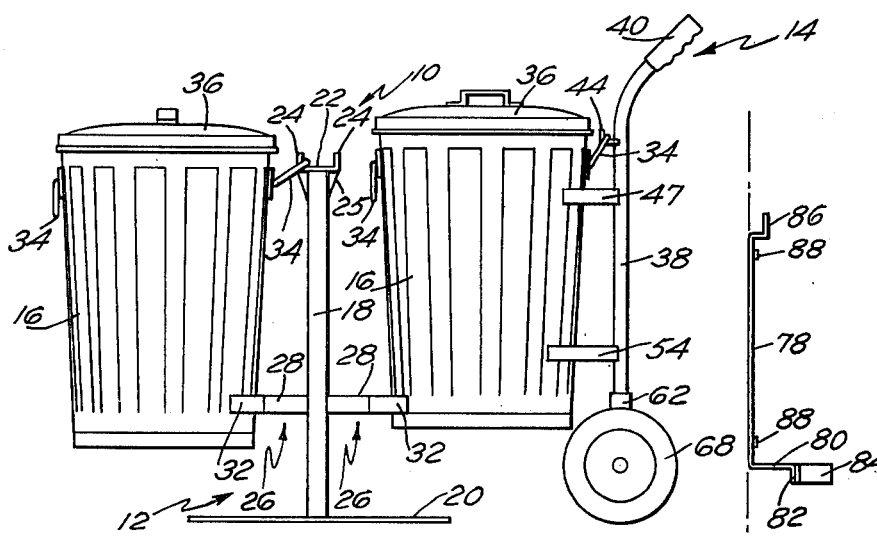
FIG. 3
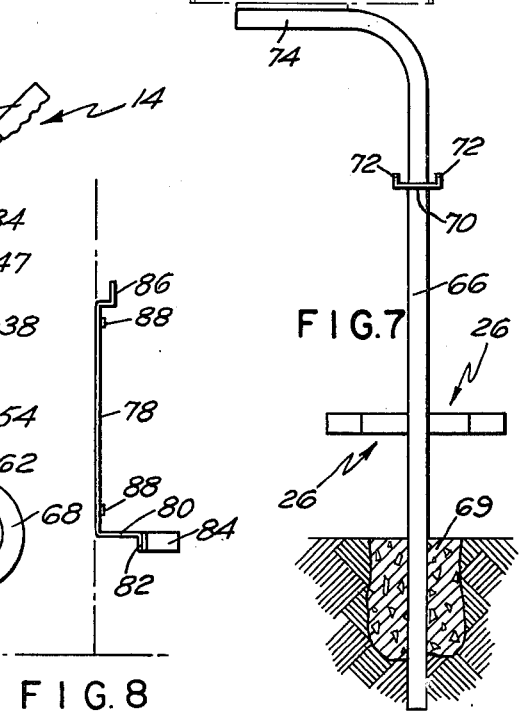
FIG. 7
FIG. 8

TRASH CAN TRANSPORTER

BACKGROUND OF THE INVENTION

This is a continuation-in-part from application Ser. No. 619,682 filed Nov. 13, 1975 and entitled "Trash Can Hanger and Transporter", now abandoned.

The present invention relates to a combination support and transporter for a trash can and is designed to support one or more trash cans thereon, a transporter or cart being provided for the easy removal of the trash can from the support.

Prior to the instant invention, trash can supports have been utilized for the purpose of storing the trash can in a substantially vertical position and removed from the floor or ground so as to prevent the inadvertent spilling of the contents of the can, and to also prevent animals from gaining access to the can or knocking the can over, thereby spilling the contents thereof. Although these prior known constructions did perform the object of storing a trash can in an elevated and vertical position, the removal of the trash can after the loading thereof while on the supports had to be accomplished by manual unloading, which required either two people to perform, or necessarily required the operator to have sufficient strength to physically lift the can from the supporting structure that was formed as part of the holding device. Furthermore, these prior known constructions were constructed of individual parts that required the bolting thereof together or otherwise necessitated special tooling to fix the individual elements of the can support in the assembled position.

U.S. Pat. Nos. 2,937,760; 3,091,342; 3,173,547; 3,288,306; 3,315,817 and 3,675,783 disclose trash can supports and U.S. Pat. Nos. 2,802,673 and 2,930,561 disclose trash can transporters that are representative of the prior art and over which the present invention defines an improvement as set out hereinafter.

SUMMARY OF THE INVENTION

The present invention which defines a new and improved transporter for a trash can is adapted for use with a support post that is mounted in a fixed vertical position. Tubular members are joined to the vertical post in opposed relation and are located in a substantially horizontal position, lower can braces having insert rods joined thereto being received in the tubular members in frictional relation. The lower can braces further include an arcuate member that is joined to the insert rod and engages a lower portion of the can when the can is mounted on the post. A handle support is fixed to the uppermost end of the post and has upstanding flanges formed thereon on which handles of opposed cans are received. The handle support cooperates with the lower can braces to support the cans in an upright position on the post. In order to remove each of the cans from the vertical post, the mobile transporter cart of the present invention is provided and includes a central column having a carriage joined to the lowermost end thereof, a handle being joined to the uppermost end of the central column. Wheels are mounted on the carriage for rotation relative thereto, and can braces are also mounted on the column in spaced relation for supporting a can during the transporting movement thereof. A handle bracket is joined to the column adjacent to the uppermost end thereof and receives the handle of a trash can that is removed from the vertical post for the transporting thereof.

Accordingly, it is an object of the present invention to provide a transporter for a trash can for use with a trash can that provides for easy removal of the trash can from a vertical post for transporting to a remote location, wherein the transporter defines a mobile cart that is arranged and constructed for removal of a trash can from the vertical post without requiring the lifting of the can by the user of the device.

Other objects, features and advantages of the invention shall become apparent as the description thereof proceeds when considered in connection with the accompanying illustrative drawings.

DESCRIPTION OF THE DRAWING

In the drawing which illustrates the best mode presently contemplated for carrying out the invention:

FIG. 1 is a side elevational view of the transporter illustrating the location of the trash cans as mounted on a vertical support and the transporter cart prior to removal of a can from the support;

FIG. 2 is a view similar to FIG. 1 showing the location of the transporter cart just prior to lifting of a can from the support;

FIG. 3 is a view similar to FIGS. 1 and 2, illustrating the location of the can on the transporter cart after the removal thereof from the support;

FIG. 4 is a rear elevational view of the transporter cart;

FIG. 5 is a top plan view of the upper brace of the can as mounted on the central column thereof;

FIG. 6 is a top plan view of the lower brace of the cart as mounted on the central column thereof;

FIG. 7 is a side elevational view of a modified form of a vertical support for a can on the upper end of which a mail receptacle is mounted; and FIG. 8 is a side elevational view of another modification of a vertical support for a can and that is attachable to a vertical wall.

DESCRIPTION OF THE INVENTION

Referring now to the drawing, and particularly to FIGS. 1, 2 and 3, a support assembly as embodied in the present invention is illustrated and is generally indicated at 10. The support assembly 10 includes a support post, generally indicated at 12, and is used in combination with a transporter cart generally indicated at 14, the cart 14 being utilized as will hereinafter be described to remove a trash can 16 from its mounted position on the support post 12.

The support post 12 includes an elongated rod or standard 18 that is fixed to a bottom plate 20, which may be free standing; although in the preferred form of the invention, the plate 20 is formed as part of a concrete slab, the standard 18 being embedded in the concrete slab a sufficient distance to prevent the standard 18 from bending under load.

Mounted on the uppermost end of the standard 18 is a handle support 22 which has opposed flanges 24 formed thereon. As will be described, the handles of the trash cans 16 are received over the flanges 24 when the trash cans are mounted in place on the support post 12. Joined to the standard and engaging the handle support 22 are tapered portions 25 that prevent the can from becoming lodged under the handle support when the transporter cart lifts the can from the support post. Also fixed to the standard 18 adjacent to the lower end thereof are can braces generally indicated at 26. Each of the can braces 26 includes a tubular member 28 that is welded directly to the standard 18. Received within the tubular member 28 is an insert rod 30 on the outermost end of which an arcuate brace member 32 is secured. The curvature of the brace member 32 is generally similar to the curvature of the body of the can 16, so that when the can 16 is mounted on the vertical post 12, it will be snugly supported by the brace member 32 as illustrated in FIGS. 1–3. The insert rod 30 is secured within the tubular member 28 without the requirement of any fastening tools or special set screws or the like, and normally is inserted for frictional engagement therewith.

As shown in FIGS. 1–3, each of the cans 16 is provided with the usual handles 34 and a top 36, the cans 16 being formed of any suitable material, such as galvanized steel or heavy duty plastic. The cans 16 are easily mounted in position on the vertical post by threading the handles 34 over the flanges 24 of the handle support 12 and allowing the lower portion of the can 16 to engage the arcuate members 32 of the lower can braces 26. As illustrated in FIGS. 1 and 2, the cans 16 in this position are elevated from the ground and are fixed in position for receiving trash or the like. The covers 36 are easily removed from the can 16 when refuse or trash is to be inserted therein.

Referring to FIGS. 4–6, the transporter cart 14 that is utilized to unload the cans 16 from the support post 12 is illustrated and includes a central column 38 that is curved at the uppermost end thereof, terminating in a handle 40. As shown in FIG. 8, a handle bracket 42 is joined to the column 38 and includes a flange 44 that receives a handle 34 of a can 16 as it is removed from the support post 12. Joined to the column 38 just below the handle bracket 42 is a can brace generally indicated at 46. As shown in FIG. 5, the can brace 46 is formed by bar stock that is bent to form angular portions 47 that are reversely bent into side portions 48 that are joined by a central portion 50, the side and end portions defining a curved pocket for snugly receiving the body of a can 16 thereagainst. The brace 46 is securely mounted on the column 38 by welding the free ends thereof to the column. Also joined to the column 38 adjacent to the lowermost end thereof is a second can brace generally indicated at 52 formed of bar stock and the elements of which are similar to the can brace 46. As shown in FIG. 6, the brace 52 includes angular portions 54, side portions 56 and a central portion 58, the side portions 56 and central portion 58 defining a curved pocket for snugly receiving the body of a can 16. Since the cans 16 are tapered, the angular portions 54 are welded to the column 38 to define a smaller angle therewith than the angular portions 47, wherein the pocket in the lower brace 52 extends more forwardly than the pocket in the upper brace 46. The can is thus located in a balanced position when mounted on the cart 14.

As more clearly illustrated in FIG. 6, the lowermost end of the column 38 has a U-shaped carriage 60 fixed thereto. The carriage 60 includes side members 62 in which openings are formed for receiving a shaft 64 therein. Wheels 68 are fixed to the outermost end of the shaft 64 for rotation therewith, and it is seen that the user of the device may place his foot on the shaft 64 for positioning the cart 14 in the proper location for removal of a can 16 from the support post 12.

Referring now to FIG. 7, a modified form of support is illustrated and includes a vertical post 66, the lowermost end of which is anchored in the ground or in a concrete block 69 as shown. Secured to post 66 adjacent the lower end thereof is a brace 70 that is constructed similarly to the braces 26 illustrated in FIGS. 1–3. A handle bracket 72 is secured to the post 66 and includes flanges 74 for retaining a handle of a can as carried by the post 66. The uppermost end of the post is curved to define an upper horizontal support 74 that is provided with a mounting bracket (not shown) that receives a receptacle, such as a mail box 76. It is seen that the device illustrated in FIG. 7 serves the dual function of supporting trash cans on the post 66 while also supporting a mail box and for this purpose has utility as used in a rural area.

Referring to FIG. 8, a further modified form of a support is illustrated and includes an elongated post 78 formed of bar stock that is bent at the lower end thereof to form a bottom shelf 80 to which a downwardly extending flange 82 is joined. A curved brace 84 is secured to the flange 82 and receives a can thereagainst. The uppermost end of the post 78 extends outwardly then upwardly to form a bracket 86 for receiving a handle of a can. The post 78 is conveniently mounted on a vertical wall such as a house or garage wall by screws or nails 88 and functions to receive a can thereon as described hereinabove.

In use of the transporter cart 14 in combination with the can supporting post 18 the cans 16 are initially mounted on the support post by locating the handles 34 on the upper handle support 22. The lowermost ends of the cans 16 are retained in position on the lower can braces 26, which cooperate to locate the can 16 in a substantially vertical position so that they may be loaded with trash or refuse as desired. Each of the cans 16 is removed from the support post 12 by maneuvering the cart 14 to that position shown in FIG. 2, wherein the adjacent handle 34 of the can to be removed is threaded over the flange of the handle bracket 44 of the cart. The can braces 46 and 52 are thereafter moved into engaging relation with the body of the can as the wheels 68 are moved to the position illustrated in FIG. 3. This lifts the handle 34 from the upper handle support 12 and the can 16 is now supported on the cart 14 for removal to a remote discharge location. The construction of the cart 14 enables the can to be easily manipulated and transported without the requirement of the user lifting the can or exerting any physical strain. It is also seen that when the cans are located in the elevated position on the support post 12, they are generally inaccessible to animals, which insures that the spilling of the contents thereof is prevented.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A mobile transporter for use in lifting a loaded garbage can onto or from a vertical support on which a flange is secured at the upper end thereof and a supporting bracket is secured intermediate the ends thereof, wherein the garbage can includes a body that tapers outwardly from bottom to top and has opposed handles joined to said body, one of said handles being engageable with said flange at the upper end of said vertical support and the can body being engageable with said supporting bracket when said garbage can is mounted on said vertical support, the improvement comprising a central column having a U-shaped carriage joined to the lowermost end thereof and a handle joined to the uppermost end thereof, an axle extending through said carriage, wheels mounted on said axle for rotation relative to said carriage, an upper can brace and a lower can brace mounted on said column in spaced vertical relation for supporting said can during the transporting movement thereof, each of said can braces being formed in a one-piece construction and including outer angular side portions having ends that are joined to said column, inner angular side portions joined to said outer angular side portions and reversely bent relative thereto, and a central portion joined to said inner angular side portions and cooperating therewith to define a pocket that is spaced forwardly relative to said column, the outer angular side portions of said lower can brace defining an angle with respect to said central column that is less than the angle that is defined therewith by the outer angular side portions of said upper can brace, wherein the pocket formed by said lower can brace extends more forwardly relative to said column than the pocket formed by said upper can brace, the pockets of each of said braces engaging the body of the can in supporting relation when said can is mounted on or lifted from said support by the transporter, the location of the can brace pockets compensating for the tapered configuration of said can body, and a handle bracket joined to said column adjacent to the upper end thereof and receiving the handle of the can thereover when said can is to be mounted on or removed from the vertical support by the transporter.

2. A mobile transporter as claimed in claim 1, the handle as joined to said column extending rearwardly with respect thereto to provide for easy maneuvering of said transporter when lifting a can from said vertical support and transporting the can to a remote location.

* * * * *